O. LULL.

Smut Machine.

No. 3,033.

Patented April 6, 1843.

UNITED STATES PATENT OFFICE.

ORRIN LULL, OF McCONNELSVILLE, OHIO.

SMUT-MACHINE.

Specification of Letters Patent No. 3,033, dated April 6, 1843.

*To all whom it may concern:*

Be it known that I, ORRIN LULL, of McConnelsville, Morgan county, and State of Ohio, have invented a new and useful Improvement in Smut-Machines, which is described as follows, reference being had to the annexed drawings of the same, making part of this specification.

Figure 3:
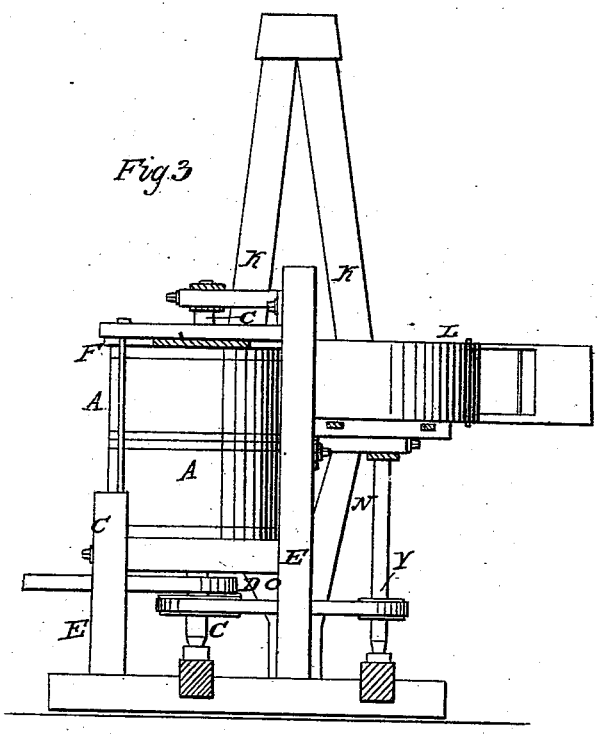
Figures 1, 2:
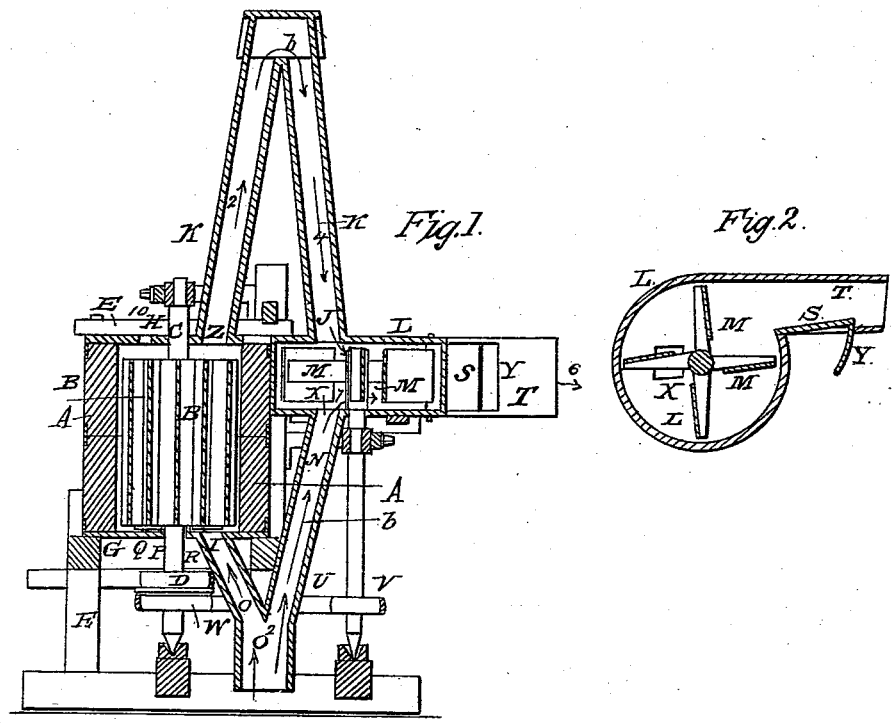

Figure 1 is a vertical section at the center of the machine. Fig. 2 is a section through the fan case and fan. Fig. 3 side elevation.

Similar letters refer to corresponding parts.

This machine consists of a circular stone concave A, roughened over the interior surface with a hammer, or other suitable implement forming protuberances or projections for breaking the smut from the grain as the latter is thrown about inside said cylinder and against the said protuberances by the wings or beaters B of a vertical revolving cylinder or shaft C turned with velocity by band and pulleys, the pulley (D) being on the lower part of the shaft C below the bottom of the aforesaid stone cylindrical concave. The aforesaid stone concave is made and put together in segments and bound or hooped with iron hoops, rings, or bands and supported in a suitable frame E bolted together with screw bolts or other suitable means—being closed at bottom and top with heads F, G, except apertures H, I, for feeding and discharging the grain and an aperture Z for a section or branch of a draft pipe K leading into a circular drum L closed at top and bottom except an aperture J in the head for the pipe or tube K and an opening X in the bottom for the pipe N and an aperture in the center of the bottom for the shaft of the fan M in which drum the said fan M revolves for producing a draft through the concave A and through the pipe N leading into it from the discharging spout O. This draft pipe like the others is made square, although it may be made round, or of any required shape. A circular rim P is formed on the bottom of the concave around the shaft. Another rim Q of greater diameter encircling the last mentioned rim is formed on the bottom of the beaters B around the shaft of the same. These rims are for preventing the grain working down into the center aperture of the shaft. Several radiating wings R of the usual form and construction are fastened to the lower end of the revolving cylinder for preventing the grain accumulating at the center of the concave. A horizontal vibrating valve S turning on a vertical pivot is placed in the tangential tube T or trunk of the fan case. This valve is for the purpose of contracting the outlet or tangential tube of the fan case. The handle Y for moving the valve S is made a segment of the circle in which its outer end moves.

The tangential tube is made in the usual manner. The fan is turned by a band U passing around a pulley V on its shaft and around the pulley W on the shaft of the beaters. The draft pipe K is made of a triangular form and rises to a sufficient height to prevent the escape of the grain and at the same time to allow of the requisite draft for carrying off the dust and dirt.

The grain containing smut is introduced to the interior of the concave by a spout leading through the aperture H in the head through a square or round spout and is met by the radiating beaters B or wings of the vertical revolving cylinder and thrown against the inside of the stationary circular stone cancave A by which operation the smut is broken without injuring the grain; at the same time a draft is created through the machine in the direction of the arrows 1, 2, 3 and through the branch spout N—air being admitted or drawn into the concave through the feeding as well as at the discharging aperture as denoted by the arrows 1, 10. Whatever dirt is not drawn off through the spout K and escapes with the grain to the discharging spout O is arrested and drawn off through the tube N to the fan case and from thence driven out at the trunk T, the cleaned grain descending by its superior gravity through the discharging spout $O^2$ to a receiver below the machine.

The concave may be the frustum of a hollow cone instead of a cylinder or of any form preferred.

What I claim as my invention and which I desire to secure by Letters Patent is—

Constructing the concave of any suitable stone and whether of the form described or of any other form preferred, likewise the arrangement of the draft pipes in combination with the fan case, trunk and valve.

ORRIN LULL.

Witnesses:
EDMUND MAHER,
W. P. ELLIOT.